(12) United States Patent
Larsson et al.

(10) Patent No.: US 10,914,245 B2
(45) Date of Patent: Feb. 9, 2021

(54) HAND-HELD POWER TOOL AND THERETO RELATED CONTROL SYSTEM AND USE AND METHOD OF CONTROLLING

(71) Applicant: HUSQVARNA AB, Huskvarna (SE)

(72) Inventors: Mikael Larsson, Jönköping (SE); Henrik Eklund, Tenhult (SE)

(73) Assignee: HUSQVARNA AB, Huskvarna (SE)

( * ) Notice: Subject to any disclaimer, the term of this patent is extended or adjusted under 35 U.S.C. 154(b) by 323 days.

(21) Appl. No.: 15/781,865

(22) PCT Filed: Dec. 7, 2015

(86) PCT No.: PCT/EP2015/078860
§ 371 (c)(1),
(2) Date: Jun. 6, 2018

(87) PCT Pub. No.: WO2017/097331
PCT Pub. Date: Jun. 15, 2017

(65) Prior Publication Data
US 2018/0363571 A1    Dec. 20, 2018

(51) Int. Cl.
*F02D 31/00* (2006.01)
*B25F 5/00* (2006.01)
(Continued)

(52) U.S. Cl.
CPC ............ *F02D 31/001* (2013.01); *B25F 5/001* (2013.01); *F02B 63/02* (2013.01); *F02D 31/006* (2013.01);
(Continued)

(58) Field of Classification Search
CPC .... F02D 41/062; F02D 41/045; F02D 31/001; F02D 31/006; F02D 31/009;
(Continued)

(56) References Cited

U.S. PATENT DOCUMENTS

| 4,491,105 A | * | 1/1985 | Johansson | ............... F02P 9/005 123/198 DC |
| 4,553,517 A | * | 11/1985 | Andreasson | ............ F02P 1/083 123/329 |

(Continued)

FOREIGN PATENT DOCUMENTS

| CN | 102654082 A | 9/2012 |
| CN | 103161591 A | 6/2013 |

(Continued)

OTHER PUBLICATIONS

International Search Report and Written Opinion for International Application No. PCT/EP2015/078860 dated Sep. 2, 2016.
(Continued)

*Primary Examiner* — Thomas M Wittenschlaeger
(74) *Attorney, Agent, or Firm* — Burr & Forman, LLP

(57) ABSTRACT

A hand-held power tool comprising an internal combustion engine (4), a working tool (6), a centrifugal clutch (8), and a control system (10) is disclosed. The engine (4) has a clutch-in speed, above which the engine (4) drives the working tool (6). The control system (10) comprises a rotation speed sensor (12), and a speed limitation controller (14), which is configured to limit an engine speed at a limitation speed below the clutch-in speed. It is active or activated during a starting procedure of the internal combustion engine (4). The control system (10) is configured to deactivate the speed limitation controller (14) upon sensing at least one acceleration at a level above the limitation speed and sensing at least one deceleration at a level above the limitation speed, such that the engine (4) is rotatable above the limitation speed to drive the working tool (6).

12 Claims, 3 Drawing Sheets

(51) Int. Cl.

| | | |
|---|---|---|
| *F02B 63/02* | (2006.01) | |
| *F02D 41/04* | (2006.01) | |
| *F02D 41/06* | (2006.01) | |
| *F02P 11/00* | (2006.01) | |
| *F02P 5/15* | (2006.01) | |
| *F02N 11/00* | (2006.01) | |
| *F02N 3/02* | (2006.01) | |
| *B23D 59/00* | (2006.01) | |
| *B27B 17/10* | (2006.01) | |

(52) U.S. Cl.
CPC ......... *F02D 31/009* (2013.01); *F02D 41/045* (2013.01); *F02D 41/062* (2013.01); *F02P 5/1506* (2013.01); *F02P 11/00* (2013.01); *B23D 59/001* (2013.01); *B27B 17/10* (2013.01); *F02D 2400/06* (2013.01); *F02N 3/02* (2013.01); *F02N 11/00* (2013.01); *Y02T 10/40* (2013.01)

(58) Field of Classification Search
CPC ..... F02D 2400/06; F02P 11/00; F02P 5/1506; B25F 5/001; F02B 63/02; B27B 17/10; F02N 11/00; F02N 3/02; B23D 59/001; Y02T 10/46
See application file for complete search history.

(56) References Cited

U.S. PATENT DOCUMENTS

| | | | | |
|---|---|---|---|---|
| 4,610,231 A * | 9/1986 | Nakata | ................... | F02P 5/1558 |
| | | | | 123/406.53 |
| 6,508,230 B2 * | 1/2003 | Sugano | ................... | F02D 37/02 |
| | | | | 123/335 |
| 7,171,942 B2 * | 2/2007 | Nickel | ................... | F02D 31/001 |
| | | | | 123/335 |
| 7,699,039 B2 * | 4/2010 | Carlsson | ................ | F02P 9/005 |
| | | | | 123/406.53 |
| 7,735,471 B2 * | 6/2010 | Andersson | ............ | F02P 5/1504 |
| | | | | 123/406.54 |
| 8,469,001 B2 * | 6/2013 | Yoshizaki | ............... | F02D 11/04 |
| | | | | 123/198 DC |
| 8,661,951 B2 * | 3/2014 | Gorenflo | ............... | B27B 17/083 |
| | | | | 30/381 |
| 9,103,289 B2 * | 8/2015 | Gwosdz | ................. | F02D 31/009 |
| 9,366,220 B2 * | 6/2016 | Leufen | .................. | F02P 5/1502 |
| 9,726,095 B2 * | 8/2017 | Yoshizaki | ............. | F02D 41/022 |
| 9,759,176 B2 * | 9/2017 | Mezaki | ................. | B27B 17/083 |
| 10,400,684 B2 * | 9/2019 | Kuroiwa | ................ | F02B 63/02 |
| 10,436,135 B2 * | 10/2019 | Larsson | ................ | F02P 5/1506 |
| 10,590,869 B2 * | 3/2020 | Axelsson | .............. | F02D 41/062 |
| 2006/0065236 A1 * | 3/2006 | Andersson | ............. | F02P 9/005 |
| | | | | 123/335 |
| 2009/0193669 A1 * | 8/2009 | Gorenflo | ............... | B27B 17/083 |
| | | | | 30/382 |
| 2010/0012084 A1 | 1/2010 | Andersson et al. | | |
| 2012/0193112 A1 | 8/2012 | Gwosdz et al. | | |
| 2013/0151126 A1 * | 6/2013 | Harrer | .................. | F02P 5/1508 |
| | | | | 701/110 |
| 2014/0034011 A1 * | 2/2014 | Gegg | ...................... | F02B 63/02 |
| | | | | 123/406.11 |
| 2014/0230787 A1 * | 8/2014 | Mezaki | .................... | F02P 5/02 |
| | | | | 123/406.52 |
| 2014/0299095 A1 * | 10/2014 | Arai | ........................ | F02P 1/083 |
| | | | | 123/343 |
| 2016/0123256 A1 * | 5/2016 | Yoshizaki | ............. | F02D 41/064 |
| | | | | 477/175 |

FOREIGN PATENT DOCUMENTS

| | | |
|---|---|---|
| CN | 103748355 A | 4/2014 |
| CN | 103883408 A | 6/2014 |
| WO | 2009085006 A1 | 7/2009 |
| WO | 2016105258 A1 | 6/2016 |

OTHER PUBLICATIONS

International Preliminary Report on Patentability for International Application No. PCT/EP2015/078860 dated Jun. 12, 2018.

* cited by examiner

HAND-HELD POWER TOOL AND THERETO RELATED CONTROL SYSTEM AND USE AND METHOD OF CONTROLLING

TECHNICAL FIELD

The present invention relates to a hand-held power tool comprising an internal combustion engine, to a control system for controlling an internal combustion engine of a hand-held power tool, to a use of a control system in a hand-held power tool, and to a method of controlling a hand-held power tool.

BACKGROUND

Hand-held power tools such as chain saws, cutting tools and grass trimmers that have internal combustion engines are known. Each of these types of machines has a working tool, such as a chain, one or more a cutting blades, or one or more cutting strings, which is brought to an operating motion by the combustion engine. Since the working tool is often close-by the operator, there is a risk of contact and an accidental injury occurring. Therefore, such machines are often equipped with various security arrangements for the protection of the operator.

The hand-held power tool may be equipped with a centrifugal clutch that engages the working tool when the engine exceeds a certain rotational speed. In normal operation, the centrifugal clutch improves safety because the working tool does not rotate, or oscillate, when the engine speed is below a clutch-in speed of the centrifugal clutch.

The hand-held power tool is normally started with the throttle valve of a carburetor of the combustion engine positioned in a starting position in order to ensure an efficient start-up. In the starting position, more air flows through the throttle valve than in an idle position of the throttle valve. Thus, the rotational speed of the combustion engine may immediately increase above the clutch-in speed of the tool when the engine starts. This may present a risk because the operator may not always be holding the hand-held tool in such a way that some of the security arrangements may provide the intended protection. Further, as the combustion engine speed quickly rises upon starting, the clutch-in speed may be reached before the operator is ready for the working tool to begin rotating, or oscillating.

Various arrangements for avoiding unintentional rotation, or oscillation, of a working tool of a hand-held power tool at start-up of the internal combustion engine, i.e. for implementing a so-called start safety function, are known. In such arrangements the rotational speed of the combustion engine is prevented from reaching the clutch-in speed by the provision of a rotational speed limitation. The rotational speed limitation has to be deactivated in order to rev up the combustion engine above the clutch-in speed. Deactivation may suitably be automatically performed when the operator is ready to use the hand-held power tool.

U.S. Pat. No. 7,699,039 discloses a method for controlling an ignition system of an internal combustion engine. A microcomputer operates a switch to control an ignition timing. The microcomputer is in communication with a speed sensor that detects the rotational speed of the engine and a speed limitation control that limits the engine speed to a limitation speed below the clutch-in speed of an included centrifugal clutch. The speed limitation control is active or activated when starting the engine. The speed limitation control is deactivated when a low speed state of the engine is detected.

Using the method of U.S. Pat. No. 7,699,039, the operator may experience some disadvantages when implementing a reliable start safety function. This disadvantage may be described as a delay to deactivate the start safety function, due to deactivation requiring the rotational speed of the combustion engine to be in the low speed state for a specified time. When the operator goes from idle to wide open throttle and back to idle again within short intervals, the rotation speed of the combustion engine does not reach the low speed state at all, or does not maintain the low speed state for the specified time. Thus, if the user intervenes in the regulating process by prematurely opening the throttle, the start safety function remains active and the user cannot increase the rotational speed above the clutch-in speed.

U.S. Pat. No. 7,735,471 discloses a method and system for controlling a light-duty combustion engine and, more particularly, a method and system that use an engine speed governor to limit the engine speed to a level that is less than a clutch-in speed of a centrifugal clutch. If it is determined that an operator is attempting to throttle or accelerate the engine, the engine speed governor is disengaged if a specific criterion is fulfilled such that normal operation can commence.

U.S. Pat. No. 8,661,951 discloses a hand-guided power tool having a drive motor and a drive element connected to and driven by the drive motor. A working tool is connected to the drive element and driven by the drive element. A braking device is correlated with the drive element, wherein the braking device in a first state, in which the braking device is applied, blocks the drive element and in a second state, in which the braking device is released, releases the drive element so that the drive elements can rotate freely. The braking device has a brake lever and a sensor that detects the first and second states of the braking device. A control unit is provided, wherein an output signal of the sensor as a state signal of the first state or the second state is supplied to the control unit. The control unit, based on the state signal, controls devices of the power tool.

SUMMARY

It is an object of the present invention to provide a hand-held power tool, in which a start safety function is deactivated if it is determined that an operator is actively attempting to operate the hand-held power tool.

According to an aspect of the invention, the object is achieved by a hand-held power tool according to claim 1. The hand-held power tool comprises an internal combustion engine, a working tool, a centrifugal clutch, and a control system. The working tool is driven by the internal combustion engine via the centrifugal clutch. The internal combustion engine has a clutch-in speed above which the internal combustion engine drives the working tool, wherein the internal combustion engine is controlled by the control system, the control system comprising a rotation speed sensor, and a speed limitation controller. The speed limitation controller is configured to limit an engine speed at a limitation speed, which limitation speed is below the clutch-in speed. The speed limitation controller is active or activated during a starting procedure of the internal combustion engine. The control system is configured to deactivate the speed limitation controller upon sensing at least one acceleration at a level above the limitation speed and sensing at least one deceleration at a level above the limitation speed, such that the internal combustion engine is rotatable above the limitation speed to drive the working tool via the centrifugal clutch.

Since sensing at least one acceleration at a level above the limitation speed and sensing at least one deceleration at a level above the limitation speed indicates that an operator is actively attempting to operate the hand-held power tool, and the control system in response thereto deactivates the speed limitation controller, the hand-held power tool is permitted to be operated above the clutch-in speed with the working tool in operation. As a result, the above mentioned object is achieved.

At the limitation speed the control system initiates measures preventing the internal combustion engine from reaching the clutch-in speed. Such measures are known in the art and may comprise one or more of the following: switching off an ignition of the internal combustion engine, altering the ignition timing of the internal combustion engine, affecting a fuel injection system, if the internal combustion engine is provided with a fuel injection system. Thus, the start safety function of the hand-held power tool is implemented.

Despite a hand-held power tool having a speed limitation controller configured to limit an engine speed at a limitation speed, the internal combustion engine may be accelerated above the limitation speed under certain circumstances. For instance when revving up the internal combustion engine from a rotational speed somewhat below the limitation speed the limitation speed may be exceeded. Thus, acceleration of the internal combustion engine at a level above the limitation speed, as required by the present condition for deactivation of the start safety function, may be performed in some types of hand-held power tools. For instance, if the ignition of the internal combustion engine is switched off at the limitation speed, an acceleration initiated below the limitation speed may continue above the limitation speed due to the moment of inertia of the rotating parts of the internal combustion engine. An abrupt restriction to the limitation speed is not possible in such case. Similarly, also for the other measures of limiting the rotational speed discussed above, the moment of inertia may cause accelerations to continue above the limitation speed. In such types of power tools the present invention may be implemented.

The hand-held power tool may be e.g. a chain saw, a cutting tool, a hedge trimmer, a grass trimmer, etc. Accordingly, the working tool may be e.g. a saw chain, a saw blade, one or more cutting blades, a string, etc. As used herein the term hand-held power tool also encompasses power tools which may be supported by an operator in other ways than carrying the entire weight of the power tool with his or her hands, such as supporting the weight of the power tool on the shoulders or the back of the operator. The latter type of power tool is hand-held in the sense that it is guided by one or both hands of the operator. A starting procedure of the internal combustion engine is an operation performed to start the internal combustion engine in order to make the internal combustion run on fuel supplied to the internal combustion engine. For instance a pull starter utilising a recoil spring, or an electric starter motor may be used during a least part of the starting procedure.

According to embodiments, the control system may be configured to deactivate the speed limitation controller upon sensing the at least one acceleration at a level above the limitation speed and sensing the at least one deceleration at a level above the limitation speed within a predetermined timespan. In this manner it may be presumed with a high likelihood that the acceleration and the deceleration are intentionally performed by the operator of the hand-held power tool.

According to embodiments, an offset speed above the limitation speed and below the clutch-in speed may be set in the control system. The sensing the at least one acceleration may comprise sensing a passing of the offset speed from a level below the offset speed to a level above the offset speed, and the sensing the at least one deceleration may comprise sensing a passing of the offset speed from a level above the offset speed to a level below the offset speed. In this manner simple criteria for judging acceleration and deceleration above the limitation speed may be provided.

According to embodiments, the control system may be configured to implement a time delay between a starting of the internal combustion engine and the deactivating of the speed limitation controller. In this manner basis may be provided for the internal combustion engine to start and run on fuel supplied to it prior to imposing further control parameters on the internal combustion engine. Moreover, a revving up of the internal combustion engine during a starting procedure thereof may not be mistaken for an intentional acceleration of the internal combustion engine by the operator. Thus, the internal combustion engine may be reliably started without accidentally deactivating the speed limitation controller.

It is a further object of the present invention to provide a control system for a hand-held power tool, in which a start safety function is deactivated if it is determined that an operator is actively attempting to accelerate the hand-held power tool.

According to an aspect of the invention, the object is achieved by a control system for controlling an internal combustion engine of a hand-held power tool, the hand-held power tool comprising a working tool, and a centrifugal clutch. The internal combustion engine has a clutch-in speed above which the internal combustion engine drives the working tool. The control system comprises a rotation speed sensor, and a speed limitation controller. The speed limitation controller is configured to limit an engine speed at a limitation speed, which limitation speed is below the clutch-in speed. The speed limitation controller is active, or activated, during a starting procedure of the internal combustion engine. The control system is configured to deactivate the speed limitation controller upon sensing at least one acceleration at a level above the limitation speed and sensing at least one deceleration at a level above the limitation speed.

Sensing at least one acceleration at a level above the limitation speed and sensing at least one deceleration at a level above the limitation speed indicates that an operator is actively attempting to operate the hand-held power tool, and the control system in response thereto deactivating the speed limitation controller, entails that the control system is permitted to operate the hand-held power tool above the clutch-in speed with the working tool in operation. As a result, the above mentioned object is achieved. In this manner the internal combustion engine is rotatable above the limitation speed to drive the working tool via the centrifugal clutch.

According to a further aspect of the invention, there is provided a use of the control system according to any one of the embodiments discussed herein in a hand-held power tool, the hand-held power tool comprising an internal combustion engine, a working tool, and a centrifugal clutch, wherein the working tool is driven by the internal combustion engine via the centrifugal clutch.

According to a further aspect of the invention, there is provided a method of controlling a hand-held power tool, the hand-held power tool comprising an internal combustion engine, a working tool, a centrifugal clutch, and a control system: The working tool is driven by the internal combustion engine via the centrifugal clutch. The internal combustion engine has a clutch-in speed above which the internal combustion engine drives the working tool, wherein the internal combustion engine is controlled by the control system. The control system comprising a rotation speed sensor, and a speed limitation controller. The speed limitation controller is configured to limit an engine speed at a limitation speed, which limitation speed is below the clutch-in speed. The method comprises steps of:

activating the speed limitation controller prior to, or during, a starting procedure of the internal combustion engine, sensing at least one acceleration at a level above the limitation speed, sensing at least one deceleration at a level above the limitation speed, and deactivating the speed limitation controller.

Further features of, and advantages with, the present invention will become apparent when studying the appended claims and the following detailed description.

BRIEF DESCRIPTION OF THE DRAWINGS

Various aspects of the invention, including its particular features and advantages, will be readily understood from the example embodiments discussed in the following detailed description and the accompanying drawings, in which.

DETAILED DESCRIPTION

Aspects of the present invention will now be described more fully. Like numbers refer to like elements throughout. Well-known functions or constructions will not necessarily be described in detail for brevity and/or clarity.

Figure 1A:
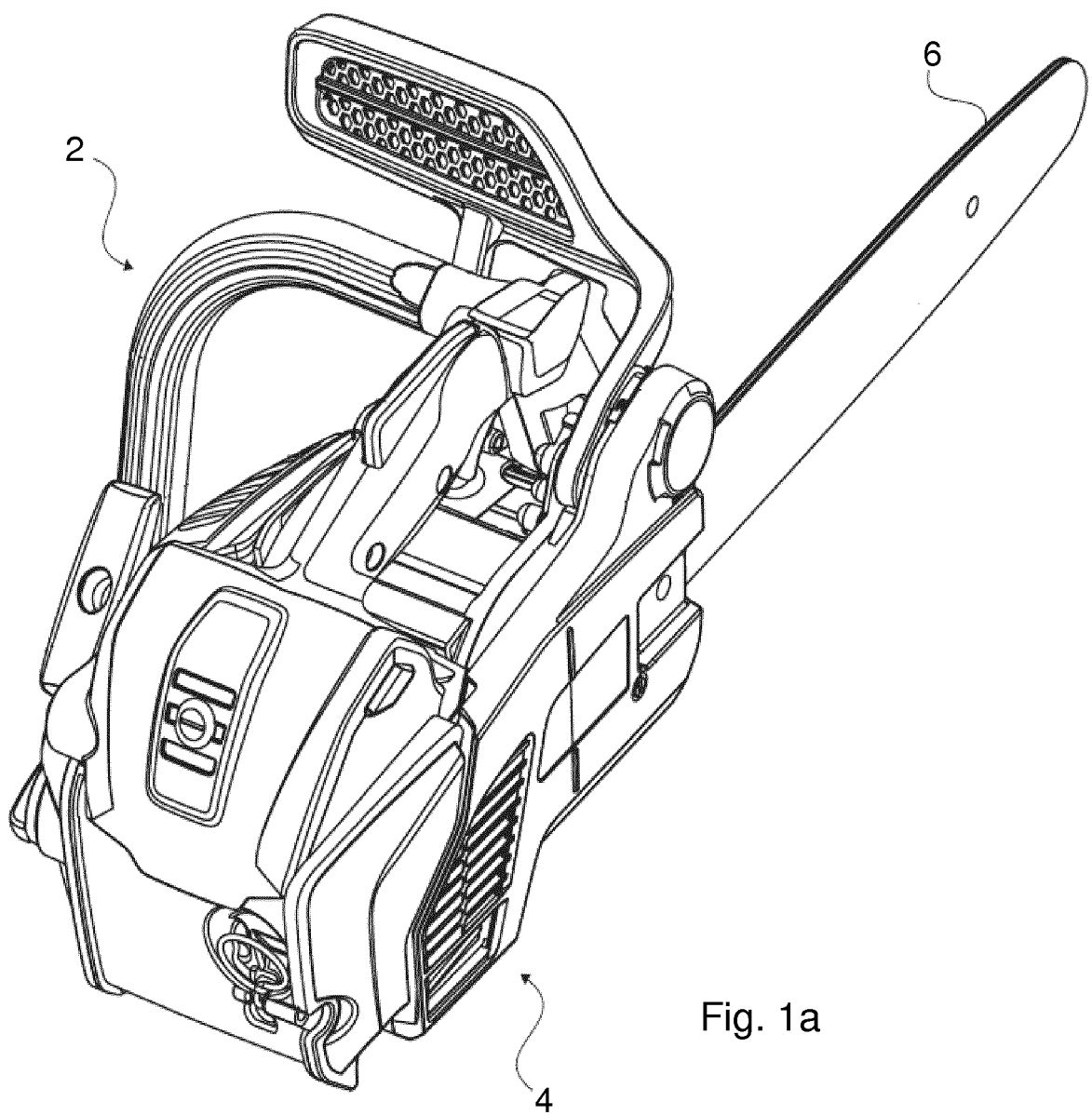
FIG. 1a illustrates a hand-held power tool according to embodiments.
Figure 1B:
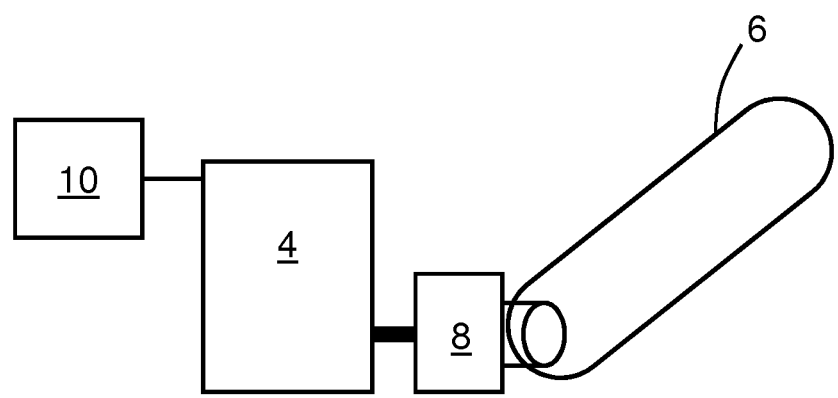
FIG. 1b illustrates schematically components of a hand-held power tool.

FIG. 1a illustrates a hand-held power tool 2 according to embodiments. In these embodiments the hand-held power tool is a chainsaw 2. FIG. 1b illustrates schematically components of the hand-held power tool 2. In the following reference is made to FIGS. 1a-1b. The hand-held power tool 2 comprises an internal combustion engine 4, a working tool 6 in the form of a saw chain, a centrifugal clutch 8, and a control system 10. The working tool 6 is driven by the internal combustion engine 4 via the centrifugal clutch 8. The internal combustion engine 4 is controlled by the control system 10. The internal combustion engine 4 has a clutch-in speed above which the internal combustion engine 4 drives the working tool 6. That is, at the clutch-in speed, the internal combustion engine 4 has a rotational speed sufficient for rotating the centrifugal clutch 8 at a speed such that it engages thus, driving the working tool 6. Below the clutch-in speed the internal combustion engine 4 has a rotational speed which is too low for rotating the centrifugal clutch 8 at a speed such that it engages, i.e. below the clutch-in speed the working tool 6 is not driven by the centrifugal clutch 8.

Figure 1C:
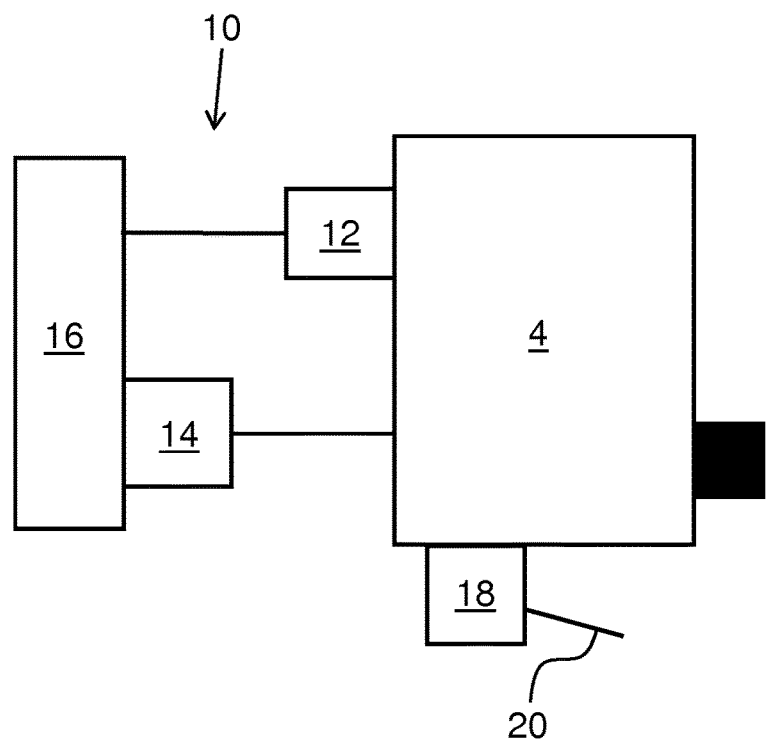
FIG. 1c illustrates schematically a control system of a hand-held power tool.

FIG. 1c illustrates schematically a control system 10 of a hand-held power tool. The control system 10 comprising a rotation speed sensor 12, and a speed limitation controller 14. The rotation speed sensor 12 is configured to sense a rotational speed of the internal combustion engine 4, and may be arrange on the internal combustion engine 4 to sense a rotation of a crankshaft of the engine 4. The speed limitation controller 12 is configured to limit an engine speed as a start safety function during start-up of the hand-held power tool, in particular during starting of the engine 4. The speed limitation controller 12, when activated, limits the rotational speed of the internal combustion engine 4 at a limitation speed, which limitation speed is below the clutch-in speed thus, preventing the engine 4 from reaching the clutch-in speed. The intention is that the speed limitation controller 12 will, when the operator starts the engine 4, stop the internal combustion engine 4 from revving up such that the centrifugal clutch 8 is prevented from driving the working tool 6. An uncontrolled driving of the working tool 6 may be dangerous for the operator. The speed limitation controller 12 is active or activated during a starting procedure of the internal combustion engine 4. The speed limitation controller 12 may only dependent on the starting of the internal combustion engine 4. This may entail that the activation of the speed limitation controller 12 may not relate to any requirement except the fact that the internal combustion engine 4 is being started. Thus, failure of the start safety function may be avoided.

The control system 10 further comprises a control unit 16, such as a central processing unit (CPU), microprocessor or similar unit, with associated memory function for storing a computer program for controlling the speed limitation controller 14, and optionally for controlling further functions of the internal combustion engine 4 and/or the hand-held power tool. The speed limitation controller 14 may be implemented as a function in the control unit 16, or may form a separate unit communicating with the control unit 16. The rotation speed sensor 12 is connected to the control unit 16. The rotation speed sensor 12 communicates data of the engine 4 to the control unit 16. Such data may be actual rotational speed data, or more or less raw data, which is used by the control unit 16 for calculating one or more different rotational speed data. Rotational speed data may be e.g. revolutions per minute (rpm), revolutions per second (rps), rad/s, average rotational speed over a specific period of time, average rotational speed over as specific number of revolutions of the engine, or any other type of filter algorithm. Within the scope of the invention every type of speed sensor is considered, including both direct and indirect sensing of the speed of the internal combustion engine 4. Examples of direct detection or sensing would be the utilization of magnetics or hall-effect sensors for detecting the rotation of the shaft or an electric sensor for detecting the current generated by a primary firing pulse generator of the combustion engine. An example of an indirect detection of the rotational speed of the engine would be the detection and counting of ignitions of a fuel/air mixture in a cylinder of the internal combustion engine 4.

In accordance with the present invention the control system 10 is configured to deactivate the speed limitation controller 12 upon sensing at least one acceleration at a level above the limitation speed and sensing at least one deceleration at a level above the limitation speed. Thus, by accelerating and decelerating the internal combustion engine 4 at a level above the limitation speed, the operator may indicate to the control system 10 that he, or she, is ready to operate the hand-held power tool 2. After the speed limitation controller 12 has been deactivated, the hand-held power tool 2 is fully operational with the working tool 6 operable, i.e. the start safety function has been deactivated.

The internal combustion engine 4 comprises according to some embodiments a throttle valve 18. A throttle lever 20 is controlled by the operator of the hand-held power tool 2 in order to control an opening degree of the throttle valve 18 and thus, the rotational speed of the internal combustion engine 4. The hand-held power tool 2 may comprise a throttle valve 18 positionable in a starting position, the starting position resulting in the internal combustion engine 4 reaching the limitation speed. More specifically, prior to starting the internal combustion engine 4, the throttle valve 18 may be positioned such that when the engine 4 starts, it reaches the limitation speed.

It may be mentioned that the internal combustion engine 4 may be operated at speeds lower than the limitation speed, e.g. at an idle speed when the throttle lever 20 is released by the operator.

Alternative means of controlling the rotational speed of the internal combustion engine 4 may be a controller of a fuel injection system, in case the internal combustion engine 4 comprises such a system.

Figure 2:
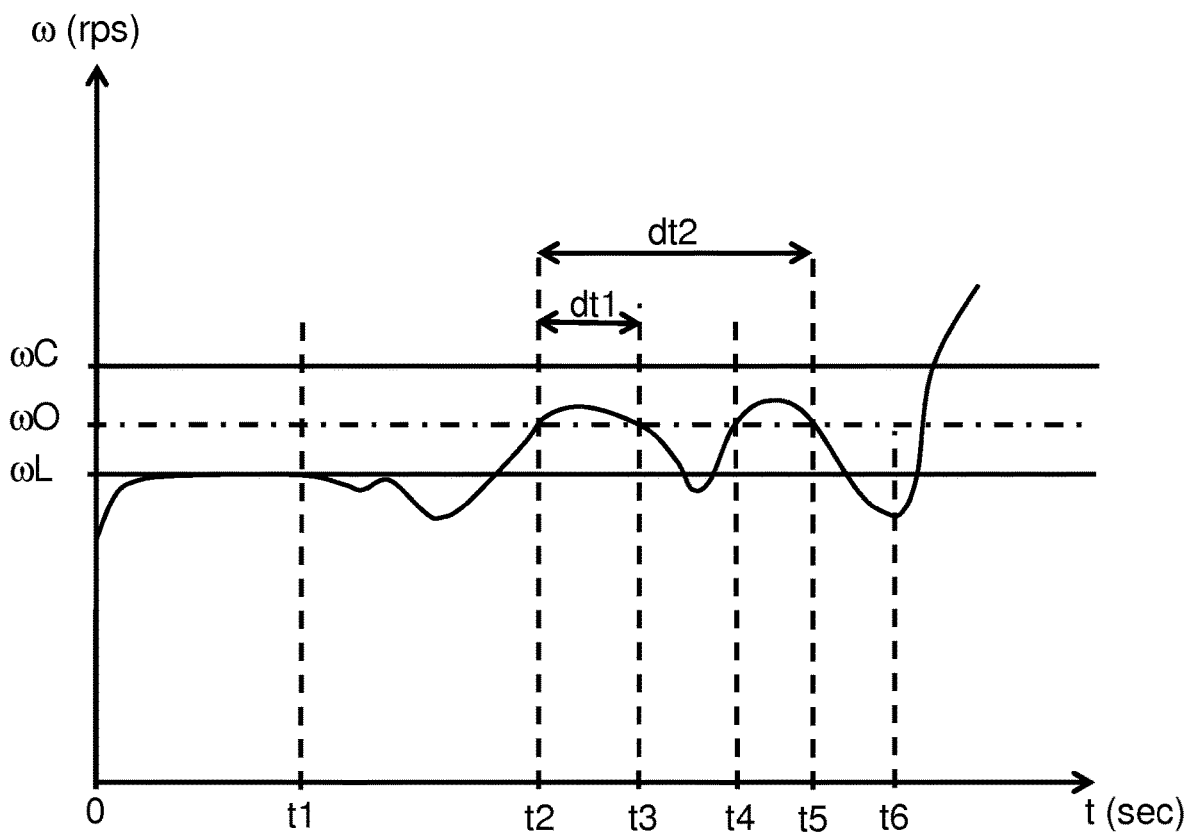
FIG. 2 illustrates a diagram depicting an operation of a control system for controlling an internal combustion engine of a hand-held power tool according to embodiments.

FIG. 2 illustrates a diagram depicting an operation of a control system for controlling an internal combustion engine of a hand-held power tool according to embodiments. Moreover, FIG. 2 illustrates a method of controlling a hand-held power tool according to embodiments. The control system may be a control system 10 as discussed above in connection with FIG. 1c.

In the diagram, time, t, is represented on the X-axis and rotations per time unit, ω, of the internal combustion engine are represented on the Y-axis. As discussed above, the hand-held power tool has a clutch-in speed, ωC, and a limitation speed, ωL. At t=0 the internal combustion engine is started and the speed limitation controller is active. The control system is configured to implement a time delay between a starting of the internal combustion engine and allowing deactivation of the speed limitation controller. During the time delay, i.e. in the diagram from t=0 to t=t1, the speed limitation controller is not deactivated. That is, during the time delay the speed limitation controller remains activated. It remains activated, irrespective of how the internal combustion engine itself behaves immediately after it has started, or of how the operator attempts to control the internal combustion engine or the hand-held power tool. The internal combustion engine may thus, start reliably before an operator is permitted to control the internal combustion engine.

As discussed above, the control system is configured to deactivate the speed limitation controller upon sensing at least one acceleration at a level above the limitation speed, ωL, and sensing at least one deceleration at a level above the limitation speed, ωL. In the diagram, accelerations at a level above the limitation speed, ωL, take place around t2 and t4. Similarly, decelerations at a level above the limitation speed, ωL, take place around t3 and t5.

In these embodiments, an offset speed, ωO, above the limitation speed, ωL, and below the clutch-in speed, ωC, is set in the control system. The sensing the at least one acceleration comprises sensing a passing of the offset speed, ωO, from a level below the offset speed, ωO, to a level above the offset speed, ωO. This takes place at t2 and t4. The sensing the at least one deceleration comprises sensing a passing of the offset speed, ωO, from a level above the offset speed, ωO, to a level below the offset speed, ωO. This takes place at t3 and t5.

Accelerations and decelerations of the internal combustion engine may be identified in a number of alternative ways. Besides the above discussed passing of an offset speed, e.g. a derivative of the graph/function representing the rotational speed of internal combustion engine may be used to identify accelerations and decelerations. A positive derivative indicates an acceleration and a negative derivative indicates a deceleration.

According to some embodiments, the control system is configured to deactivate the speed limitation controller upon sensing one acceleration at a level above the limitation speed, ωL, and sensing one deceleration at a level above the limitation speed, ωL. In the diagram of FIG. 2 the speed limitation controller would be deactivated after t=t3 since the criterion would be fulfilled at that point in time.

According to the embodiments of FIG. 2, the control system is configured to deactivate the speed limitation controller upon sensing at least two accelerations at a level above the limitation speed, ωL, and sensing at least two decelerations at a level above the limitation speed, ωL. In this manner the likelihood of the operator is actually controlling the internal combustion engine to accelerate and decelerate is higher than if only one acceleration and one deceleration is required to deactivate the speed limitation controller. In the diagram these criteria are fulfilled. As discussed above, at t2 and t3 first accelerations and decelerations take place, and at t4 and t5 second accelerations and the decelerations take place. Thereafter, the operator may rev up the internal combustion engine as indicated at the far right of the diagram. Suitably, a first acceleration is followed by a first deceleration, and a second acceleration is followed by a second deceleration, and so on.

According to some embodiments the control system may be configured to deactivate the speed limitation controller only after the engine speed goes below the limitation speed, ωL, after the one or more accelerations and decelerations above at the limitation speed, ωL. This is indicated at t6 in the diagram of FIG. 2. In alternative embodiments the control system may be configured to deactivate the speed limitation controller only after the engine speed goes below a deactivation speed, after the one or more accelerations and decelerations above at the limitation speed, ωL. The deactivation speed may be a rotational speed below the offset speed, ωO. The deactivation speed may be a rotational speed below the limitation speed, ωL.

According to embodiments, the control system may be configured to deactivate the speed limitation controller upon sensing the at least one acceleration at a level above the limitation speed and sensing the at least one deceleration at a level above the limitation speed, within a predetermined timespan. As indicated in FIG. 2 the first acceleration and deceleration are performed with in a timespan indicated with dt1. In embodiments were only one acceleration and deceleration are required for deactivation of the speed limitation controller, the timespan dt1 has to be within the predetermined timespan, tlim, i.e. if the criterion dt1≤tlim is fulfilled, the speed limitation controller is deactivated. In embodiments were two accelerations and decelerations are required for deactivation of the speed limitation controller, the timespan dt2 has to be within the predetermined timespan, tlim, i.e. if the criterion dt2 tlim is fulfilled, the speed limitation controller is deactivated. The predetermined timespan, tlim, may suitably differ depending on the number of accelerations and decelerations required to be performed during the predetermined timespan, tlim.

Mentioned purely as an example, the predetermined timespan, tlim, may have a length of one or a few seconds, or may be 10-20 seconds, all depending on the number of accelerations and decelerations required, the type and size of internal combustion engine, as well as the type of hand-held power tool. Also the limitation speed, ωL, the clutch-in speed, ωC, and the offset speed, ωO, may depend on the type and size of internal combustion engine, as well as the type of hand-held power tool. Mentioned purely as an example, for a chainsaw having a 2-stroke internal combustion engine of 50 cm3, the limitation speed, ωL, may be approximately 60 rps, the clutch-in speed, ωC, may be approximately 68 rps, and the offset speed, ωO, may be approximately 63 rps, the rotational speed being an average rotational speed calculated over the latest 10 revolutions of the engine.

Figure 3:
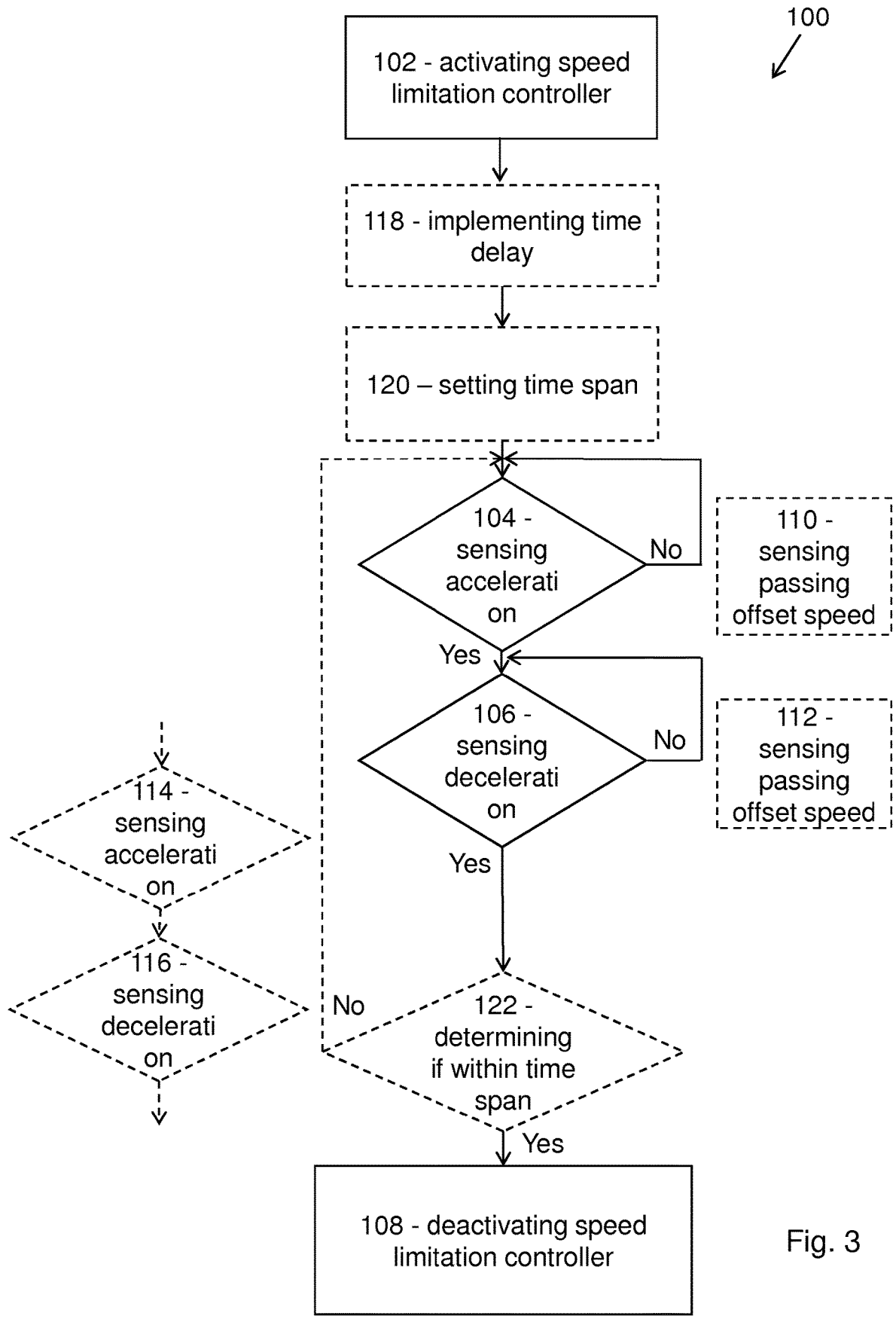
FIG. 3 illustrates a method of controlling a hand-held power tool.

FIG. 3 illustrates a method 100 of controlling a hand-held power tool. The hand-held power tool is a hand-held power tool 2 as discussed above in connection with FIGS. 1a-1c. The hand-held power tool comprises a control system 10 as discussed in connection with FIGS. 1c-2. The diagram of FIG. 2 also relates to the method 100 of controlling the hand-held power tool.

The method comprises steps of:
  activating 102 the speed limitation controller prior to, or during, a starting procedure of the internal combustion engine,
  sensing 104 at least one acceleration at a level above the limitation speed,
  sensing 106 at least one deceleration at a level above the limitation speed, and
  deactivating 108 the speed limitation controller.

The step of sensing 104 the at least one acceleration may comprise a step of:
  sensing 110 a passing of an offset speed from a level below the offset speed to a level above the offset speed.

The step of sensing 106 the at least one deceleration may comprise a step of:
  sensing 112 a passing of the offset speed from a level above the offset speed to a level below the offset speed.

The step of sensing 104 the at least one acceleration may comprise a step of:
  sensing 114 at least two accelerations at a level above the limitation speed, and The step of sensing 106 the at least one deceleration may comprises a step of:
  sensing 116 at least two decelerations at a level above the limitation speed.

The method may comprise a step of:
  implementing 118 a time delay between a starting of the internal combustion engine and the deactivating 108 of the speed limitation controller.

The method may comprise a step of:
  setting 120 a predetermined timespan, within which the steps of sensing 104 the at least one acceleration and sensing 106 the at least one deceleration are to be performed in order to deactivate the speed limitation controller.

If the method comprise the step of setting 120 the predetermined timespan, the method 100 comprises the step of:
  determining 122 whether the steps of sensing 104 at least one acceleration at a level above the limitation speed and sensing 106 at least one deceleration at a level above the limitation speed are performed within a predetermined timespan, and only then performing the step of deactivating 108 the speed limitation controller.

The step of setting 120 the predetermined timespan may be performed at a beginning of the method 100 e.g. as illustrated in FIG. 3. Alternatively, the step of setting 120 the determined timespan may be performed in the control system already when programming the control system. In practice the control system may comprise a timer function for measuring a timespan, dt. The timer function may be started at a first acceleration at the level above the limitation speed and stopped at the last deceleration above the limitation speed. If the timespan, dt, is within the predetermined timespan, tlim, i.e. if dt≤tlim, the speed limitation controller is deactivated.

It is to be understood that the foregoing is illustrative of various example embodiments and that the invention is defined only by the appended claims. A person skilled in the art will realize that the example embodiments may be modified, and that different features of the example embodiments may be combined to create embodiments other than those described herein, without departing from the scope of the present invention, as defined by the appended claims. For instance, the appended claims encompass both the alternative where the sensing of the acceleration is performed before the sensing of the deceleration, as well as the alternative where the sensing of the deceleration is performed before the sensing of the acceleration. In the latter case the deceleration has been preceded by an acceleration which may have been ignored by the control system. It is further to be understood that the control system may be configured to deactivate the speed limitation controller 14 based on further criteria, such as e.g. the low speed state of an internal combustion engine as discussed in U.S. Pat. No. 7,699,039.

The invention claimed is:

1. A hand-held power tool comprising an internal combustion engine, a working tool, a centrifugal clutch, and a control system, wherein the working tool is driven by the internal combustion engine via the centrifugal clutch, wherein the internal combustion engine has a clutch-in speed above which the internal combustion engine drives the working tool, wherein the internal combustion engine is controlled by the control system, the control system comprising a rotation speed sensor, and a speed limitation controller, wherein the speed limitation controller is configured to limit an engine speed at a limitation speed, which limitation speed is below the clutch-in speed, and wherein the speed limitation controller is active or activated during a starting procedure of the internal combustion engine,
  characterized in that the control system is configured to deactivate the speed limitation controller upon sensing at least one acceleration when the engine speed is above the limitation speed and sensing at least one deceleration when the engine speed is above the limitation speed, such that the internal combustion engine is rotatable above the limitation speed to drive the working tool via the centrifugal clutch,
  wherein an offset speed above the limitation speed and below the clutch-in speed is set in the control system,
  wherein the sensing the at least one acceleration comprises sensing a passing of the offset speed from a level below the offset speed to a level above the offset speed, and
  wherein the sensing the at least one deceleration comprises sensing a passing of the offset speed from a level above the offset speed to a level below the offset speed.

2. The hand-held power tool according to claim 1, wherein the control system is configured to deactivate the speed limitation controller upon sensing the at least one acceleration when the engine speed is above the limitation speed and sensing the at least one deceleration when the engine speed is above the limitation speed within a predetermined timespan.

3. The hand-held power tool according to claim 1, wherein the control system is configured to deactivate the speed limitation controller upon sensing at least two accelerations when the engine speed is above the limitation speed and sensing at least two decelerations when the engine speed is above the limitation speed.

4. The hand-held power tool according to claim 1, wherein the hand-held power tool comprises a throttle valve positionable in a starting position, and wherein the starting position will result in the internal combustion engine reaching the limitation speed.

5. The hand-held power tool according to claim 1, wherein the control system is configured to implement a time delay between a starting of the internal combustion engine and the deactivating of the speed limitation controller.

6. A control system for controlling an internal combustion engine of a hand-held power tool, the hand-held power tool comprising a working tool, and a centrifugal clutch, wherein the internal combustion engine has a clutch-in speed above which the internal combustion engine drives the working tool, wherein the control system comprises a rotation speed sensor, and a speed limitation controller, wherein the speed limitation controller is configured to limit an engine speed at a limitation speed, which limitation speed is below the clutch-in speed, and wherein the speed limitation controller is active or activated during a starting procedure of the internal combustion engine,
  characterized in that the control system is configured to deactivate the speed limitation controller upon sensing at least one acceleration when the engine speed is above the limitation speed and sensing at least one deceleration when the engine speed is above the limitation speed,
  wherein an offset speed above the limitation speed and below the clutch-in speed is set in the control system,
  wherein the sensing the at least one acceleration comprises sensing a passing of the offset speed from a level below the offset speed to a level above the offset speed, and
  wherein the sensing the at least one deceleration comprises sensing a passing of the offset speed from a level above the offset speed to a level below the offset speed.

7. The control system according to claim 6, wherein the control system is configured to deactivate the speed limitation controller upon sensing the at least one acceleration when the engine speed is above the limitation speed and sensing the at least one deceleration when the engine speed is above the limitation speed within a predetermined timespan.

8. The control system according to claim 6, wherein the control system is configured to deactivate the speed limitation controller upon sensing at least two accelerations when the engine speed is above the limitation speed and sensing at least two decelerations when the engine speed is above the limitation speed.

9. The control system according to claim 6, wherein the control system is configured to implement a time delay between a starting of the internal combustion engine and the deactivating of the speed limitation controller.

10. Use of the control system according to claim 6 in the hand-held power tool, wherein the working tool is driven by the internal combustion engine via the centrifugal clutch.

11. A method of controlling a hand-held power tool, the hand-held power tool comprising an internal combustion engine, a working tool, a centrifugal clutch, and a control system, wherein the working tool is driven by the internal combustion engine via the centrifugal clutch, wherein the internal combustion engine has a clutch-in speed above which the internal combustion engine drives the working tool, wherein the internal combustion engine is controlled by the control system, the control system comprising a rotation speed sensor, and a speed limitation controller, wherein the speed limitation controller is configured to limit an engine speed at a limitation speed, which limitation speed is below the clutch-in speed, wherein an offset speed above the limitation speed and below the clutch-in speed is set in the control system, wherein the method comprises steps of:
  activating the speed limitation controller prior to, or during, a starting procedure of the internal combustion engine,
  sensing at least one acceleration when the engine speed is above the limitation speed,
  sensing at least one deceleration when the engine speed is above the limitation speed, and
  deactivating the speed limitation controller,
wherein the step of sensing the at least one acceleration comprises sensing a passing of the offset speed from a level below the offset speed to a level above the offset speed, and wherein the step of sensing the at least one deceleration comprises sensing a passing of the offset speed from a level above the offset speed to a level below the offset speed.

12. The method according to claim 11, comprising a step of:
  determining whether the steps of sensing at least one acceleration when the engine speed is above the limitation speed and sensing at least one deceleration when the engine speed is above the limitation speed are performed within a predetermined timespan, and only then performing the step of deactivating the speed limitation controller.

* * * * *